United States Patent
Tho et al.

(10) Patent No.: US 8,449,171 B2
(45) Date of Patent: May 28, 2013

(54) METHOD FOR MICROFLUIDIC MIXING AND MIXING DEVICE

(75) Inventors: Paul Mun Foo Tho, Parkville (AU); Richard Manasseh, Balaclava (AU); Yonggang Zhu, Cheltenham (AU); Guy Metcalfe, Mentome (AU)

(73) Assignee: Commonwealth Scientific and Industrial Research Organisation, Australian Capital Territory (AU)

( * ) Notice: Subject to any disclaimer, the term of this patent is extended or adjusted under 35 U.S.C. 154(b) by 970 days.

(21) Appl. No.: 11/910,420

(22) PCT Filed: Apr. 7, 2006

(86) PCT No.: PCT/AU2006/000473
§ 371 (c)(1),
(2), (4) Date: Sep. 2, 2008

(87) PCT Pub. No.: WO2006/105616
PCT Pub. Date: Oct. 12, 2006

(65) Prior Publication Data
US 2009/0034360 A1    Feb. 5, 2009

(30) Foreign Application Priority Data

Apr. 8, 2005    (AU) ................................. 2005901760

(51) Int. Cl.
*B01F 11/02*    (2006.01)
(52) U.S. Cl.
CPC ....................................... *B01F 11/02* (2013.01)
USPC ............................................ 366/108; 366/127
(58) Field of Classification Search
CPC ................................................... B01F 11/0266
USPC .............................. 366/108, 116, DIG. 4, 127
See application file for complete search history.

(56) References Cited

U.S. PATENT DOCUMENTS

| | | | | |
|---|---|---|---|---|
| 3,087,840 A | * | 4/1963 | Shaw | ........................... 366/108 |
| 3,614,069 A | * | 10/1971 | Murry | ........................... 366/119 |
| 4,398,925 A | * | 8/1983 | Trinh et al. | ....................... 95/30 |
| 4,983,189 A | * | 1/1991 | Peterson et al. | ......... 210/748.02 |
| 5,523,058 A | * | 6/1996 | Umemura et al. | ............ 422/128 |
| 5,733,527 A | * | 3/1998 | Schutt | ........................... 424/9.52 |
| 6,010,316 A | * | 1/2000 | Haller et al. | .................. 417/322 |
| 6,244,738 B1 | * | 6/2001 | Yasuda et al. | ................. 366/114 |
| 6,386,748 B1 | * | 5/2002 | Huber et al. | .................... 366/79 |
| 6,682,214 B1 | * | 1/2004 | Vivek et al. | .................... 366/108 |
| 6,902,313 B2 | * | 6/2005 | Ho et al. | ....................... 366/108 |

(Continued)

FOREIGN PATENT DOCUMENTS

| JP | 11347392 A | 12/1999 |
|---|---|---|
| WO | WO01/21291 | 3/2001 |
| WO | WO2004/076046 | 9/2004 |

OTHER PUBLICATIONS

Liu et al. Hybridization enhancement using cavitation microstreaming. Analytical Chemistry 2003, 75 (8), pp. 1911-1917.*

*Primary Examiner* — Tony G Soohoo
(74) *Attorney, Agent, or Firm* — Kilpatrick Townsend & Stockton LLP

(57) ABSTRACT

A method of mixing (10), including: providing a fluid (10) in a well (6) so as to establish an acoustic field gradient; and applying an acoustic signal to cause mixing within a fluid (3).

21 Claims, 6 Drawing Sheets

U.S. PATENT DOCUMENTS

| | | | |
|---|---|---|---|
| 6,910,797 B2 * | 6/2005 | Falcon | 366/127 |
| 2002/0009015 A1 * | 1/2002 | Laugharn et al. | 366/108 |
| 2002/0150539 A1 * | 10/2002 | Unger | 424/9.52 |
| 2003/0175947 A1 * | 9/2003 | Liu et al. | 435/288.5 |
| 2004/0053290 A1 * | 3/2004 | Terbrueggen et al. | 435/6 |
| 2004/0066703 A1 * | 4/2004 | Sparey-Taylor et al. | 366/127 |
| 2004/0115097 A1 | 6/2004 | Wixforth et al. | |
| 2005/0123482 A1 * | 6/2005 | Unger | 424/9.52 |
| 2006/0050605 A1 * | 3/2006 | Markhasin | 366/116 |
| 2006/0252054 A1 * | 11/2006 | Lin et al. | 435/6 |
| 2007/0002678 A1 * | 1/2007 | Murakami | 366/116 |
| 2009/0034360 A1 * | 2/2009 | Tho et al. | 366/127 |
| 2009/0168591 A1 * | 7/2009 | Wenzel et al. | 366/116 |
| 2010/0135104 A1 * | 6/2010 | Schoenfeld | 366/114 |

* cited by examiner $D_m = 526\ \mu m$

Figure 3 : Streaming patterns around a 272 μm radius bubble at various driving frequencies.

METHOD FOR MICROFLUIDIC MIXING AND MIXING DEVICE

FIELD OF THE INVENTION

This invention relates to microfluidic mixing.

BACKGROUND OF THE INVENTION

New-generation pathology-testing devices are examples of microtechnological systems where small quantities (nanoliters) of liquid need to be mixed. Presently, much larger volumes (milliliters) of a patient's body fluids are sent away for testing in pathology laboratories, where such samples are mixed with reagents indicating particular medical conditions. This causes significant delays between test and diagnosis. Thus there is great interest in cheap, self-contained 'lab-on-a-chip' micro-devices that could make instant screening tests at the point of care. Because of their size, such devices inherently demand the mixing of only a tiny drop. Unfortunately, mixing at microscale is very difficult and slow, owing to the absence of turbulence.

The absence of turbulence at microscale makes most proposed point-of-care or handheld pathology screening tests dependent on diffusion, which takes an impractically long time before a result can be obtained. In this application, very small, finite volumes of liquid, typically a few tens of microliters, must be set into motion. A small drop two millimeters in diameter has a volume of about four microliters. The starting volumes are small and finite for two reasons. Firstly, obtaining milliliters rather than microliters from a patient escalates the intervention required—instead of a pinprick or swab, a syringe puncturing a vein would be required, demanding paramedical assistance and impractically lengthening any mass-screening or point-of-care procedure. Secondly, at least the part of the device in contact with the sample should be disposable to eliminate expensive sterilization and cross-contamination issues, and micro-volumes allow cheap, disposable sample-processing elements. In some cases, one or more microliter-sized drops must be mixed. In other cases, detection of a target molecule relies on target molecules in the liquid being driven on a sufficiently space-filling trajectory for it to contact to the detector surface in as short a time as possible. In such 'batch' processes, most typical of pathology tests, engineering of complex devices to pump or stir the liquids together could make the device uneconomic.

An application typical of the new generation of screening-type pathology tests is to mix a single drop of patient's sample fluid with a pre-loaded 'reagent' or detector liquid, which would most probably contain engineered antibodies used in an immunoassay. The sample could be taken from a pinprick or swab, and might be collected in a context such as an airport, or a patient's point-of-care, where an elementary 'maybe/no' screening result is needed in a short time. The mixing should occur on a 'chip' that is simple and cheap enough to be disposable, so that any complex electronics are housed in a separate, 'reader' unit. If the target protein indicating a disease state is present in the patient's sample, the antibodies would bind to it and undergo a colour or fluorescence change, or cause an optical change in the properties of the surface to which antibodies may be bound. This change would be detected by equipment in the reader unit. The challenge is to design a chip that is capable of receiving a single drop, without a complex liquid feeding system, and mix the drop efficiently enough with the reagent for any binding reactions to occur over a timescale of tens of seconds rather than hours. Timescales of hours would render the test useless from a point-of-care perspective.

There are many aspects to mixing in microfluidic systems, as reviewed recently by Ottino & Wiggins[1], and there are many relevant quantitative measures of mixing[2]. From a practical perspective, whatever method is used to achieve micromixing[3-6] is likely to be subjected to a series of engineering refinements and improvements, especially in the light of the final end-use of the device. Presently, most micromixing efficiency assessments rely on simple assessments by eye of the mixing time; a recent example of batch micromixing which makes such an assessment is Lee & Ram[7]. In general, the mixing time is the time for introduced dye to appear uniformly dispersed through a mixing vessel[8,9].

Acoustic microstreaming is a phenomenon where sound waves propagating around a small object create a mean flow in the vicinity of the obstacle. It is a nonlinear second-order effect driven by the viscous shear in the boundary layer near the object. It is particularly enhanced where the object is a bubble, because the bubble can resonate to the applied sound in one or more ways, locally amplifying and transforming the microstreaming effect. Bubbles can oscillate in several ways, the most common being a volumetric or 'breathing' mode[10], which has a well-known natural frequency inversely proportional to the bubble radius. However, bubbles in microdevices are invariably near at least one wall, which is known to make a significant change to the volumetric mode frequency[11]. Moreover, under the influence of applied sound, the bubble can also translate either parallel to or perpendicular to walls, complicating the flow[12]. Thus, although experiments on streaming around an oscillating bubble date to the 1950s[13,14], rigorous theoretical prediction of the flows in practical geometries remains challenging. More recently, Marmottant and Hilgenfeldt[15] showed that the shear forces developed around a microstreaming bubble could be used to lyse cells.

Liu et al.[3,16] showed that acoustic microstreaming could be used for micromixing. In their experiment, air bubbles trapped in pockets inside a circular chamber 300 μm deep and 15 mm in diameter were excited; dye was used to observe the resulting streaming motion. However, there is little quantitative information available about the flow field induced by the streaming and mixing times were subjectively estimated.

US 2003/0175947 discloses a device which utilises one or more bubbles caused to oscillate at a resonant frequency in order to facilitate mixing by a process of cavitation microstreaming. The principle theory presented is that the microstreaming occurs when the relevant bubble undergoes volume change within a sound field. Although there is a disclosure of the applied frequency being over a frequency range, the teaching of the reference is that microstreaming, arising about a single bubble excited close to resonance, produces strong liquid circulation flow in the associated microfluidic chamber but that a variation in frequency or radius of the bubble from the conditions for maximum motion causes the streaming to be inappreciable.

SUMMARY OF THE INVENTION

In accordance with the invention, there is provided a method of mixing within a liquid, including:
  providing a liquid-gas interface so as to establish an acoustic field gradient; and
  applying acoustic signals at a first and second frequency, respectively, to establish flow patterns within the liquid with streamlines that cross when the frequency is changed.

The crossing streamlines result in chaotic mixing. Such mixing can provide for a reduction in mixing time as compared to previous acoustic mixing methodologies.

In another aspect, there is provided a method of mixing, including:

providing a first fluid in a well so as to establish an acoustic field gradient; and applying an acoustic signal to cause mixing within a fluid. Preferably, the method further includes applying a second acoustic signal to effect chaotic mixing within the first fluid.

Preferably the first and second signals are at first and second frequencies, respectively, for establishing flow patterns with streamlines that cross when the frequencies are alternately applied.

Preferably, the acoustic field gradient is formed between a first fluid and a second fluid.

Preferably, the first fluid is a liquid and the second fluid is a gas.

Preferably, the second fluid is in the form of a gas bubble within the first fluid. Preferably, the second fluid is ambient air Preferably, the first fluid contacts a wall of the well and the acoustic field gradient is established adjacent the wall. Preferably, the contact of the fluid with the wall forms a meniscus, which produces the acoustic field gradient.

In another aspect, there is provided a mixing device, including a well for receiving a fluid to establish an acoustic field gradient, and an acoustic transmitter adapted to apply an acoustic signal to cause mixing within the fluid. Preferably, the well is open to ambient air.

In accordance with the invention, there is provided a method of mixing including forming a bubble within a fluid and applying different acoustic frequencies such that the bubble adopts different modes of oscillation that drive different streaming patterns.

Preferably, the acoustic frequencies are applied such that transition of the bubble-driven flow between the different streaming patterns causes chaotic mixing of the fluid.

Preferably, the different frequencies cause the bubble to transition between one or more of linear translation, volume, shape, elliptical or circular orbiting oscillation modes.

In another aspect, there is provided a mixing device including a housing which defines a chamber and provides a site for at least one bubble to be formed, and an acoustic transmitter adapted to apply the different frequencies.

DESCRIPTION OF THE DRAWINGS

The invention is described, by way of non-limiting example only, with reference to the drawings, in which.

DETAILED DESCRIPTION

Figure 1:
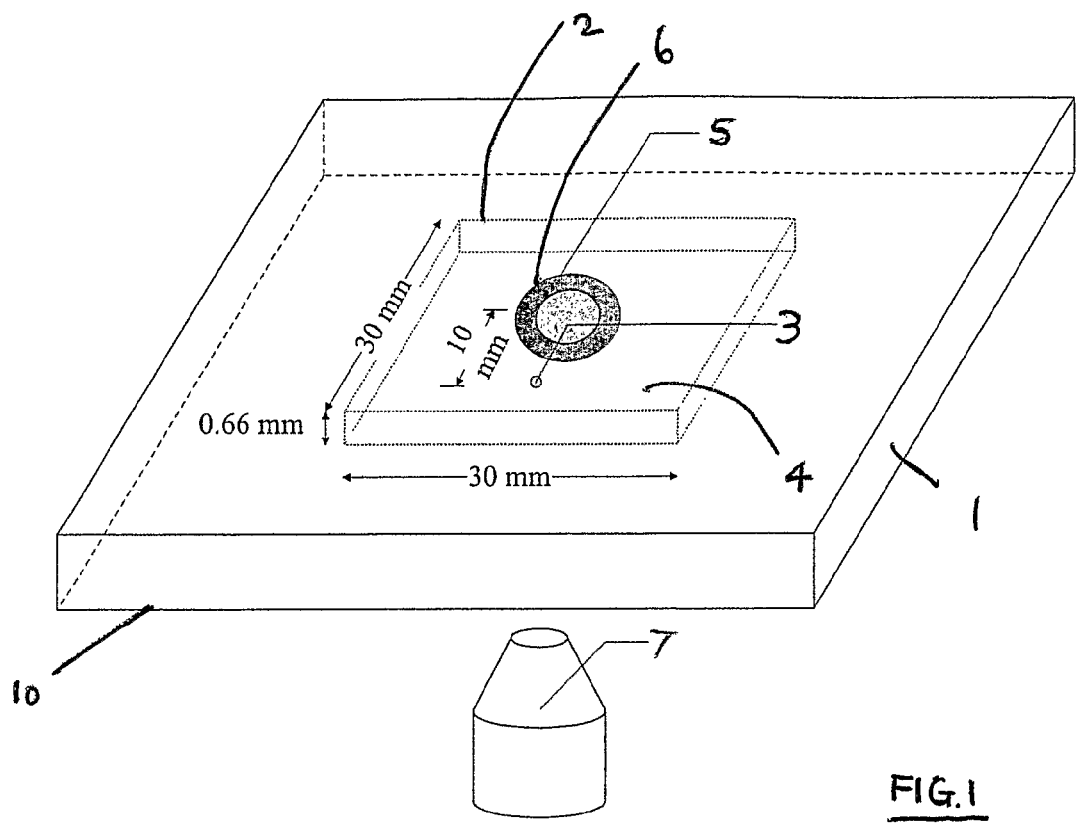
FIG. 1 is a diagrammatic perspective view of a mixing device.

An example of a mixing device 10 is shown in FIG. 1 as including an acrylic housing 1 with an internal rectangular chamber 2 with a length and width dimension in the order of 30 mm and a depth dimension in the order of 0.66 mm. The chamber 2 provides a site for formation of a bubble 3 which is held captive on a wall 4 of a chamber 2. An acoustic transmitter 5 in the form of a piezoelectric disc 6 is also provided for transmitting acoustic waves through fluid within the chamber 3, for the purpose of generating oscillation modes of the bubble 3. The distance of the bubble 3 from the centre of the piezoelectric disc 6 may be in the order of 10 mm.

A microscope objective 7 is also provided for the purpose of observing the flow field around the bubble 3 during oscillation. Such observation allows experimental measurements to be carried out under a micro-particle image velocimetry (PIV) system, as well as streak photographs to be taken, for the purpose of determining velocity and fields of measurements of the motion of the bubble. In that regard, the fluid within the cavity is provided with fluorescent microspheres or other suitable tracer particles.

Figure 2:
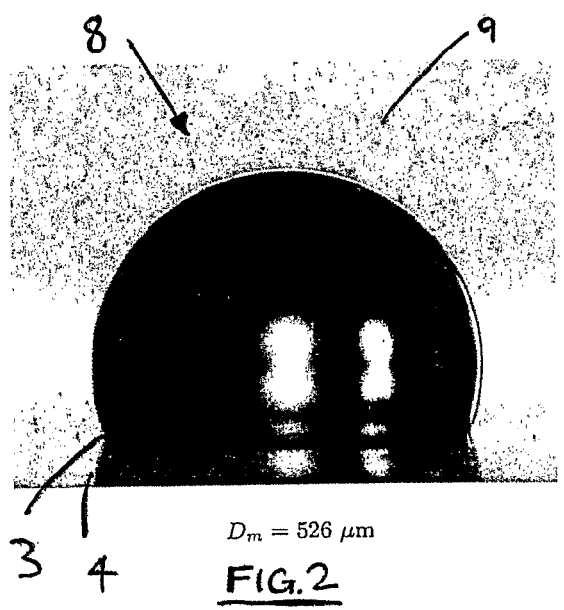
FIG. 2 is a perspective view of a bubble formed in the mixing device.

An image of a bubble, with diameter 526 micrometers is shown in FIG. 2, within the fluid 8, in which microspheres 9 are visible.

Figure 3:
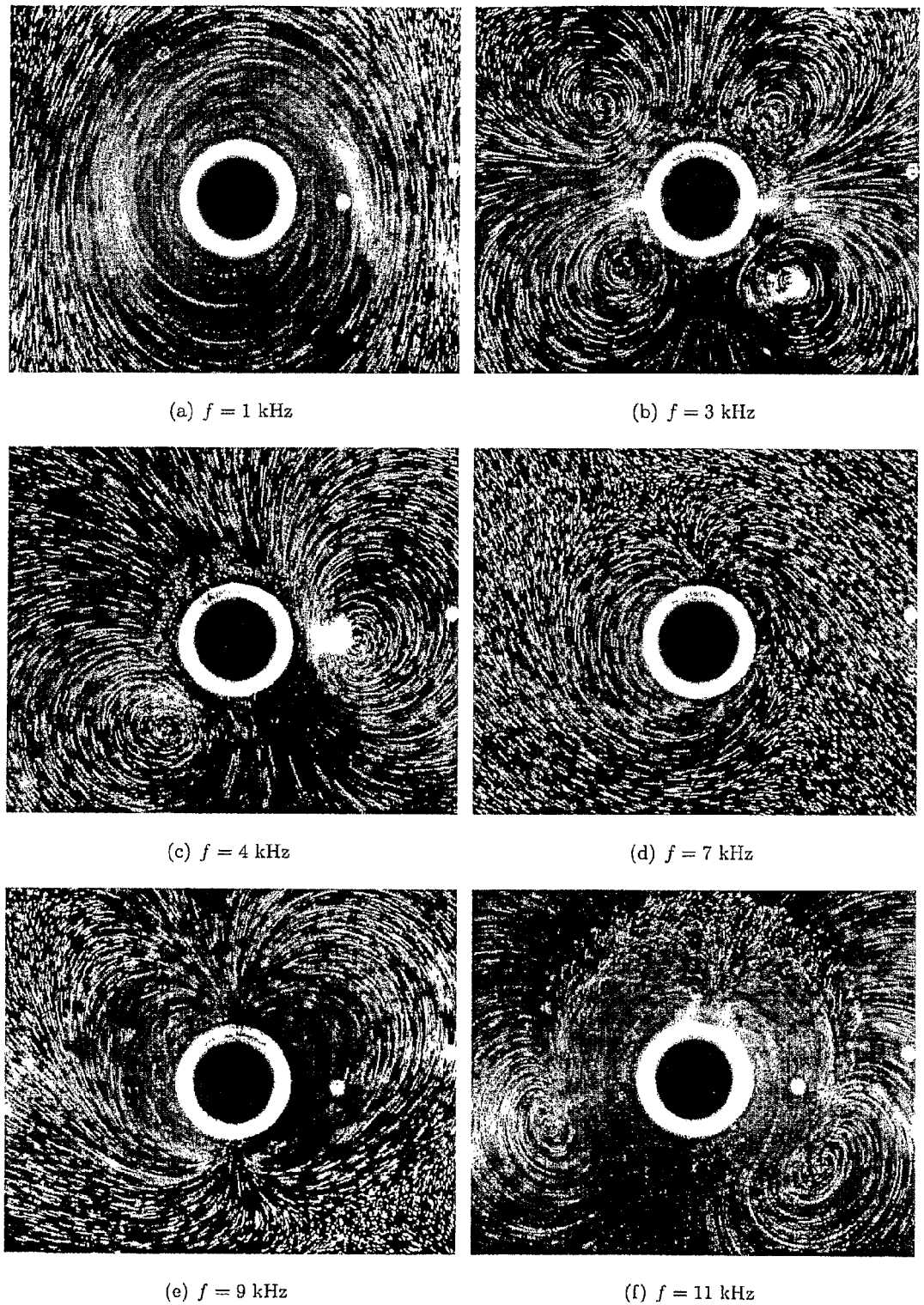
FIG. 3 illustrates streaming patterns around a bubble at various driving frequencies.

In order to initiate bubble microstreaming, a signal was applied to the piezoelectric disc 6 over a range of frequencies and streaming motions were recorded using streak photography along a plane parallel to the wall 4. FIG. 3 shows streaming patterns around a 272 μm radius captive bubble at different driving frequencies. The majority of the streaming patterns shown exhibit some regularity or symmetry. FIG. 3(a) shows a uniform circulation around the bubble, which resembles a potential vortex. FIG. 3(b) shows a streaming pattern consisting of vortices split into four quadrants. This pattern is usually associated with a linear translating oscillation mode and will be referred to as a 'quadrupole' pattern for convenience. FIGS. 3(c) and 3(e) show streaming patterns with a plane of symmetry along the bubble with flow recirculating within each half. These patterns resemble a 'dipole'. FIG. 3(f) shows the streaming pattern around a bubble that is undergoing a shape oscillation at 11 kHz. Not all the streaming patterns are symmetrical. As the frequency is varied, the streaming patterns undergo slight variations as they transform from one pattern to another. In these intermediate stages where the gradual changes occur, the pattern may not be symmetrical. An example of this is shown in FIG. 3(d).

The variation in streaming patterns with the driving frequency usually occurs continuously and smoothly. However, occasionally a sudden change in streaming pattern would occur. These would appear as either a reversal in flow direction or the sudden onset of a completely new mode of streaming such as when a bubble suddenly exhibits a shape oscillation. The sudden changes in streaming pattern may be the result of a resonance of the bubble or in the piezoelectric driving system. Resonances in the piezoelectric disk are demonstrated in Tho[12], Section 3.2.1 where a plot of sound pressure against frequency showed numerous peaks in pressure amplitude.

The variations in streaming pattern must be associated with different modes of oscillation of the bubble. Symmetrical streaming patterns are caused by symmetrical modes of oscillation of the bubble and likewise asymmetric streaming patterns must be a result of asymmetric modes of oscillation. The steadiness of the streaming suggests that whether or not the mode of oscillation is symmetric or asymmetric, it is at the very least periodic, otherwise the streaming velocities would fluctuate with time.

The individual streaming patterns are investigated in Tho[12], which is incorporated herein in its entirety. It is found the various patterns in fact result from the bubble adopting different oscillation modes as a result of the applied frequency. These modes can be broadly divided into translating modes of oscillation where the centroid of the bubble shifts in position; volume oscillations where the bubble expands and contracts in shape and volume, and shape oscillations where the surface of the bubble deforms into a variety of shapes. The measurements taken for all these modes of oscillation, with the exception of the shape mode oscillations, include streak photographs, micro-PIV determined velocity and vorticity fields and measurements of the motion of the bubble's centroid and radius.

The streaming flows were shown to be affected by three main parameters: the excitation frequency, the pressure amplitude (a function of the voltage amplitude of the input signal) and the size of the bubble. Adjustment of the excitation frequency was shown to bring about the most significant changes in the streaming pattern. The streaming patterns mostly vary continuously and smoothly from one pattern to another as the frequency is varied. This gives rise to a wide variety of streaming patterns, some of which are regular and symmetrical. The variation in streaming pattern with the driving acoustic frequency has not been demonstrated before. The way in which the frequency alters the streaming pattern is believed to be a characteristic of the design and construction of the piezoelectric disk 6 and chamber 3, rather than an inherent frequency response in the bubble. The exception to this is when a bubble is forced into volume oscillations when it is excited at its natural resonance frequency.

As may be appreciated, the microfluidic mixing device of the prior art utilised only the natural resonant frequency of the bubble as the driver for initiating cavitation microstreaming. However, the present invention takes advantage of a surprising result that the construction of the mixing device itself allows the bubble to adopt different modes of oscillation, which are also effective in generating cavitation microstreaming at frequencies other than the natural resonant frequency. Accordingly, when different frequencies are applied, the bubble will transition from one oscillating mode to another. During such transitions, streamlines within the velocity field surrounding the bubble will crossover. Crossing streamlines are known to generate chaotic flow which will substantially increase the mixing capability of the device far beyond that achieved using the microstreaming achieved with the prior art natural resonant frequency only.

Figure 4:
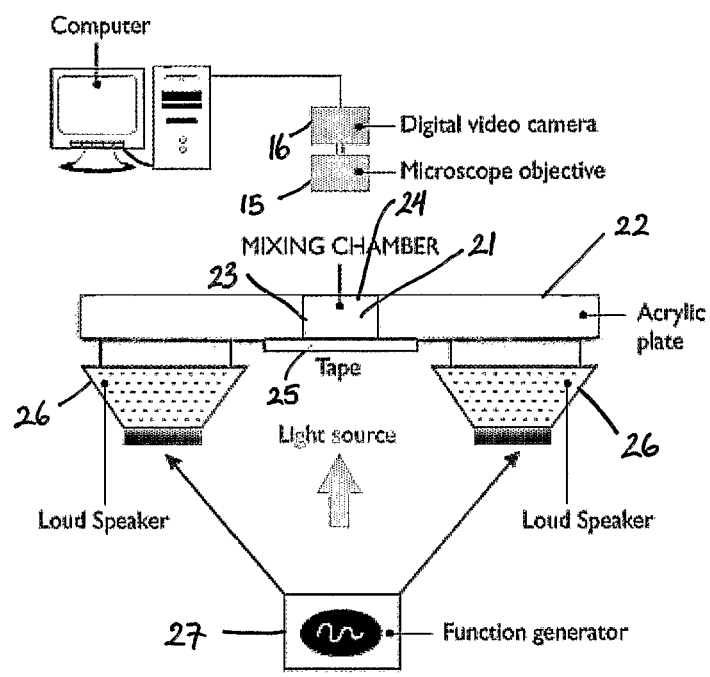
FIG. 4 is a diagrammatic view of an alternative mixing device.

Turning now to FIG. 4, a system is illustrated in which further experiments with chaotic mixing can be demonstrated. The set-up consists of a microscope 15 (World Precision Instruments PZMTIII) imaging the acoustic streaming experiment in standard transmission mode at 2× magnification. The light source was a tungsten lamp fed via a fibre-optic cable (Microlight 150 W). A digital camera 16 capable of 60 frames per second (Basler A602fc) was set at 7.5 frames per second. The white balance was set on background images and the gain and shutter speed were fixed during the experiments.

The experimental mixing device 20 included a mixing chamber 21, which was made as simple as possible to illustrate the effects of chaotic acoustic micromixing relative to simple acoustic micromixing. However, future more complex designs affording better interfacial curvature via bubble trapping may be better. The chamber 21 was simply a 4 mm diameter hole drilled through an acrylic plate 22 76×195 mm in size and approx 1.63+/−0.02 mm thick, creating a cylindrical well 23. The chamber top 24 was open to the air and the bottom was sealed with office sticky tape 25 (Marbig clear). The apparent expediency of drilling only part-way through the plate to leave a solid acrylic bottom was eschewed, since experience showed that slight irregularities in the bottom surface properties would be harder to control, reducing experimental reproducibility. Sound was applied by a pair of computer speakers 26 (4 Ohm, 20 kHz). These were mounted firmly on the microscope base and the plate taped to them with the well in between the speakers. In prior experiments, reported in detail in Tho 2005[12], a variety of piezoelectric transducers had been used at frequencies ranging from sub-kiloHertz to over 1 MHz, and while acoustic streaming could be generated with the piezoelectric transducers, the greater power offered in the kiloHertz range by conventional audio speakers generated streaming velocities significantly higher than the piezoelectric transducers.

A function generator 27 (Wavetek model 145) was used to generate a sinusoidal signal with an amplitude of 1.00+/−0.02 V.

The speaker volume control was set to maximum. To provide a reproducibility check on the volume of sound emitted, a button microphone (Genexxa 33-3003) was mounted via a bubble-wrap vibration isolator on the acrylic plate. The microphone centerline was horizontal and on the well's horizontal centreline with an accuracy of +/−1 mm, and was about 13+/−1 mm above the plate top; the front of its face was 12+/−1 mm away from the well's vertical centreline. A standard foam windsock was fitted to the microphone.

At an applied frequency of 140+/−0.5 Hz, the microphone output showed several frequencies as well as the main 140 Hz response. These were clearly due to a combination of the plate and speaker resonances—they could be changed by putting a finger on the plate. The output was 55 mV peak-to-peak (pp). At 195 Hz (+/−0.5 Hz), the microphone output was equally polyphonic and generated a spike at the main 195 Hz response that was 73 mV p-p, although most of the waveform power was about 55 mV p-p, as in the 140 Hz case.

Figure 5:
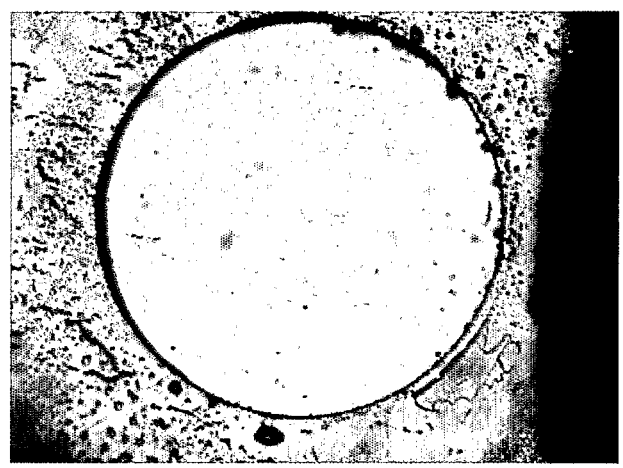
FIG. 5 is a plan view of a mixing chamber of the device of FIG. 4.

The pre-loaded 'reagent' or detector liquid was modelled by making a solution of 50 mL of glycerol (molecular weight 92.0) and 10 mL of de-ionized (DI) water into which had been dissolved 4 g of KCl. It was important to create a concave meniscus in the well, essentially because it permitted visualization of the entire chamber. If the meniscus were convex, it would act like a converging lens, creating a bright spot in the chamber centre surrounded by a wide black rim that would obscure most of the behaviour. Approximately 16 μL of the glycerol solution was placed in the well with a precision micropipette (Eppendorf 10 μL). Small quantities, totalling approximately 1 μL, were removed until the appearance was clear on the camera, without the black rim, presumably because the meniscus transitioned from convex to concave. Hence the final volume could be considered 15+/−1 μL. Slight changes in surface curvature on addition of the dye drop would sometimes also create a locally convex meniscus, unavoidably reducing image quality during the experiment. Images of the chamber were captured in this 'background' state (e.g. FIG. 5) to ensure any variations in illumination, camera gain, etc, could be corrected for if necessary.

Blue dye was made by dissolving 2.523 g of Brilliant Blue dye (Asia Pacific Specialty Chemicals Limited, CI 42090, molecular weight 792.86) in 300 mL DI water. To begin the experiment, the dye was formed into a 0.100+/−0.005 μL drop and placed in the chamber. On the images to be shown, the initial drop size appears to vary somewhat, but this was due to small variations in the time taken to switch on the sound, plus the fact that the drop initially spreads rapidly on the surface only, as will be discussed shortly.

Experiments were run with diffusion only, at two constant frequencies to be discussed shortly that both generated vigorous and different streaming patterns, and in a regime that alternated between the patterns.

The images were stored as individual, uncompressed frames and transferred to a Unix computer for subsequent processing. Images were cropped to the well outline; and two alternative techniques of emphasizing any unmixed regions were applied. Firstly, a sequence of frames was composited together and a uniform gamma correction of 2.0 was applied to the composite image. This effectively brightened the image, stretching contrast in the dark dyed zones. Secondly, a standard histogram-equalization algorithm (Image Magick 5.4.7) was run on each frame to normalize the contrast between mixed and un-mixed zones, and the resulting frames composited together.

Figure 6:
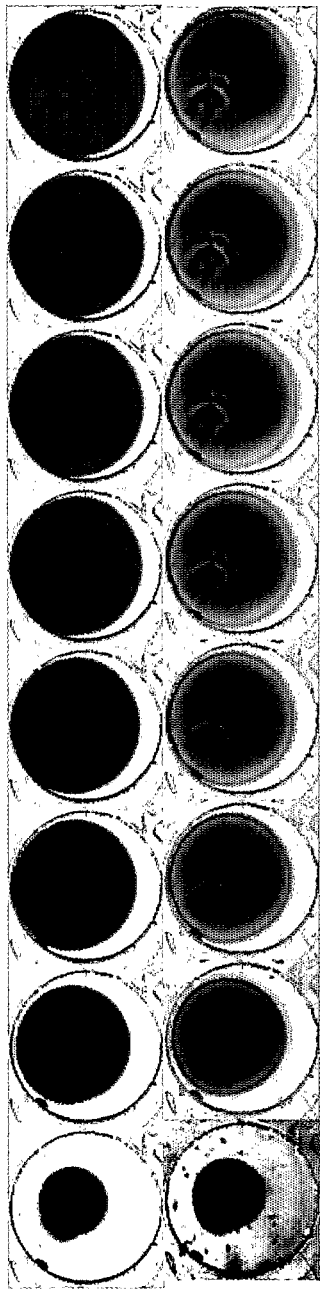
FIG. 6 shows a time sequence of the mixing chamber, illustrating a diffusion process.

FIG. 6 shows the time sequence with natural diffusion only. Frames shown are from the first 210 s following drop introduction and from left are at times t=0, 30, 60, 90, 120, 150, 180 and 210 s. Drop spreads only on surface at first and 'clumping' represents dye beginning to settle to bottom. A gamma factor of 2.0 has been applied to the composite image image in the top panel and in the bottom panel each individual frame has been histogram-equalized to emphasize any unmixed zones.

Figure 7:
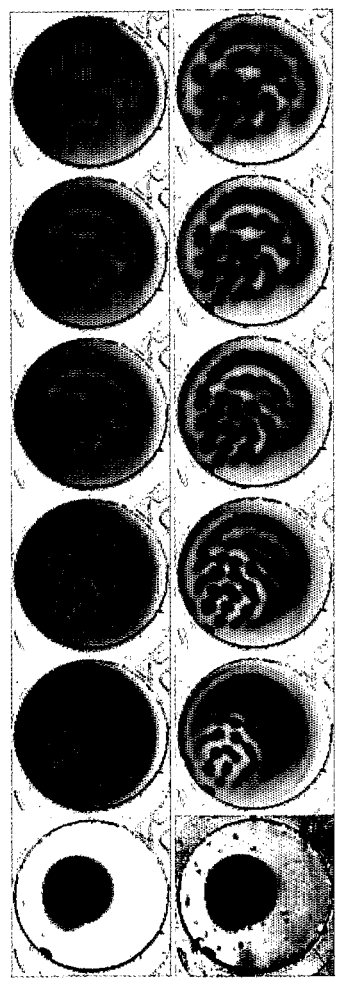
FIG. 7 illustrates a longer time sequence of the diffusion process.

FIG. 7 shows a sequence with greater time delay. Frames shown are from the first 50 min following drop introduction and from left are at times t=0, 10, 20, 30, 40 and 50 min. Thus the frames of FIG. 3 (for t=30 s to t=3 min 30 s) fit in between the first and second frames on the left of FIG. 4. A gamma factor of 2.0 has been applied to the composite image in the top panel and in the bottom panel each individual frame has been histogram-equalized to emphasize any unmixed zones.

Figure 8:
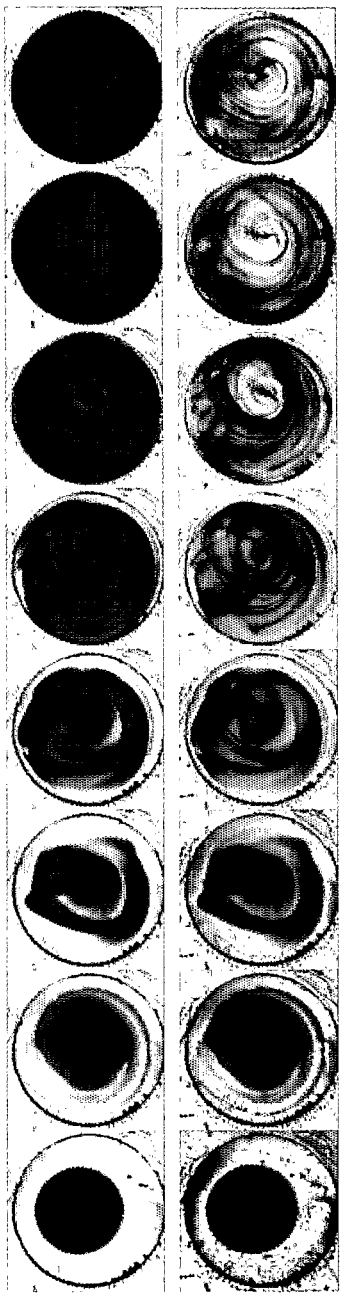
FIG. 8 shows a time sequence of the mixing chamber with an applied frequency of 140 Hz.

FIG. 8 shows the time sequence with an introduced sample drop under the influence of a constant-frequency acoustic micromixing regime at 140 Hz. As in FIG. 6, frames shown are from the first 210 s following drop introduction and from left are at times t=0, 30, 60, 90, 120, 150, 180 and 210 s. Dark crescent-shaped regions on every frame are optical effects due to surface curvature. A gamma factor of 2.0 has been applied to the composite image in the top panel and in the bottom panel each individual frame has been histogram-equalized to emphasize any unmixed zones.

Figure 9:
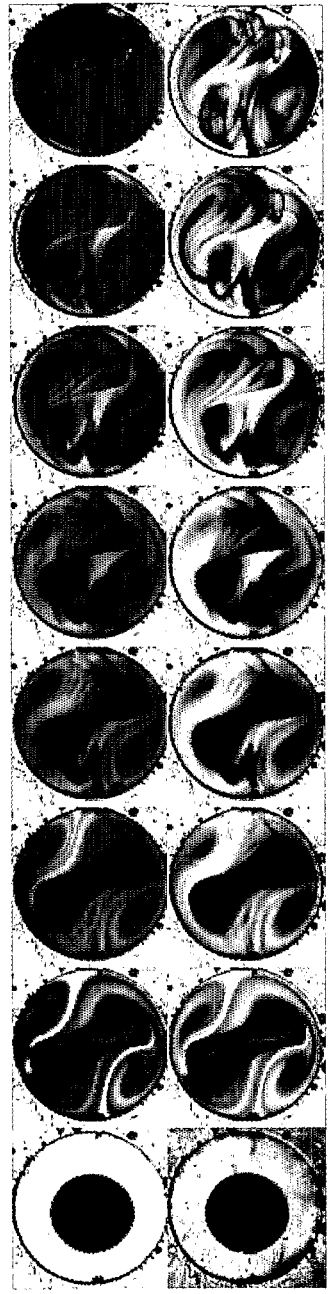
FIG. 9 shows a time sequence of the mixing chamber with an applied frequency of 195 Hz.

FIG. 9 shows the time sequence with an introduced sample drop under the influence of a constant-frequency acoustic micromixing regime at 195 Hz. As in FIG. 6, frames shown are from the first 210 s following drop introduction and from left are at times t=0, 30, 60, 90, 120, 150, 180 and 210 s. Dark crescent-shaped regions on every frame are optical effects due to surface curvature. A gamma factor of 2.0 has been applied to the composite image in the top panel and in the bottom panel each individual frame has been histogram-equalized to emphasize any unmixed zones.

Figure 10:
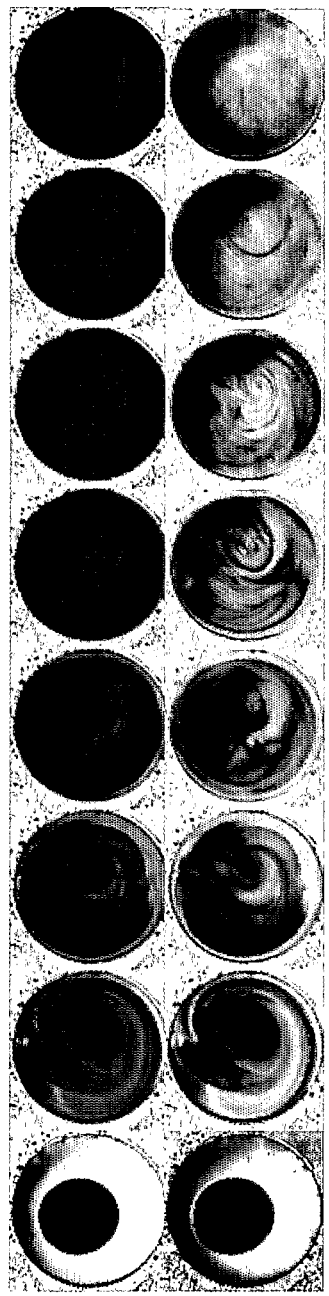
FIG. 10 shows a time sequence of the mixing chamber, illustrating chaotic mixing.

FIG. 10 shows the time sequence with an introduced sample drop under the influence of a chaotic acoustic micromixing regime cycling 15 s at 195 Hz, then 50 s at 140 Hz. As in FIG. 3, frames shown are from the first 210 s following drop introduction and from left are at times t=0, 30, 60, 90, 120, 150, 180 and 210 s. Dark crescent-shaped region on every frame is an optical effect due to surface curvature. A gamma factor of 2.0 has been applied to the composite image in the top panel and in the bottom panel each individual frame has been histogram-equalized to emphasize any unmixed zones.

Earlier studies (Liu et al 2003[3], Tho et al 2005[12], Manasseh et al 2005[17]) had been conducted in a system with trapped bubbles, in which the acoustic microstreaming effect was due to the sharp gradient in acoustic field created by the curvature of the bubble. However, trial experiments leading to the present results found that the gradient in acoustic field due to the curvature of the liquid surface in a small well open to atmosphere is sufficient and produces excellent streaming. The most elementary comparison is between a drop placed on a hydrophobic plate, which will stream, whereas a drop on a hydrophilic plate will not. The difference appears entirely due to the small radius of curvature the drop on a hydrophilic surface is forced to adopt at its contact line. Similarly, if a well is filled with liquid so that the radius of curvature of the meniscus is similar to the well radius—a requirement that for a given liquid reduces to the requirement that the well is small—acoustic microstreaming is readily and reproducibly driven. If the well is filled below the brim, acoustic streaming works, and if it is overfilled (meaning the liquid profile is above the top of the plate), acoustic streaming works equally. However, once a lid is placed over an overfilled well, so that there is no meniscus and no sharp gradient in acoustic field, streaming is eliminated entirely.

As can be seen from the Figures, when experiments were run in which the dye drop was left to spread under the effects of diffusion only, in the first 10-20 s, the drop spreads fairly rapidly on the surface only. It was easily checked by eye that the dye liquid spreads on the surface only, by observing its behaviour from the side in a separate container. This spread is probably due to differences in surface tension. In the 4 mm diameter experimental mixing chamber, the drop rarely covers the surface entirely, typically leaving a crescent-shaped zone completely clear of introduced molecules for ten minutes or so. Gradually, dye begins to 'clump', probably under the influence of double-diffusive instabilities (e.g. Turner & Veronis 2000), and only then begins to settle to the bottom. A typical situation after 210 s is shown in FIG. 6; here, the bulk of the introduced molecules would not have reached the bottom of the well yet. Experiments with this combination of liquids typically take well over an hour before the dye appears uniform. The diffusive behaviour over 50 min is shown in FIG. 7. Even after 50 min, diffusive instabilities have clearly not yet distributed the introduced molecules throughout the well, and a rough assessment of the mixing time would be at least 100 min.

With reference to application of acoustic signals, sound was applied to the system in a continuously swept range of frequencies in 10 Hz, 100 Hz, 1 KHz, 10 KHz and 100 KHz bands. Naturally, the speakers are designed to respond within the human hearing range and would have their strongest response in the 0.1-10 kHz band. Four reproducible frequencies were identified in which acoustic streaming was significant, within a band of a 5-10 Hertz around 140 Hz, 195 Hz, 230 Hz and 350 Hz. These frequencies should not be taken as being of fundamental significance since they are likely to be features of the resonances of the particular plate, mounting and cavity geometry used. The strongest responses were at 140 Hz and 195 Hz, with 140 Hz generating significantly stronger flows. At 140 Hz, the pattern was a vortex while at 195 Hz, a dipole pattern appeared. These two patterns satisfied the chaotic mixing criterion of having crossed streamlines.

Firstly, constant-frequency sound was applied at each of 140 Hz and 195 Hz to determine the improvement over diffusive-only mixing. It can be seen in FIG. 8 that at 140 Hz, the mixing was dramatically enhanced over the diffusive case (FIG. 3), although some striations were still visible by 210 s. The mixing at 195 Hz, shown in FIG. 9, was much slower. Using the best constant-frequency case of 140 Hz, a reduction in the mixing time from 100 min to 5 min seemed feasible.

An alternating regime was applied commencing with 15 s of 195 Hz, then 50 s of 140 Hz. This regime was not optimized systematically to obtain the best chaotic mixing results (e.g. Lester et al 2006[19]) but was merely the result of a few limited trial-and-error tests. The resulting behaviour over 210 s is shown in FIG. 10 and should be compared with the behaviour over the same time due to diffusion only shown in FIG. 6 and the constant-frequency patterns of FIGS. 8 and 9. In FIG. 10, three complete cycles of the alternating regime are included and the 15 s, 195 Hz phase of a fourth cycle has just completed by 210 s. Clearly, very fine striations are obtained after only a few minutes and a rough assessment of the mixing time would be approximately 3 min.

Mixing appeared to have progressed to the same extent as the pure 140 Hz case at 210 s by (120-150 s). Hence, the application of a chaotic mixing regime with alternating frequencies and thus alternating patterns improved the mixing time by roughly 30-40% over applying a constant frequency thence a constant pattern. The alternating experiment could be repeated with indistinguishable results, confirming the improvement conferred by a chaotic mixing regime.

As can be seen, the application of an acoustic signal significantly enhances mixing, which results from microstreaming. More fundamentally, the generation of acoustic microstreaming is due to the nonlinearities in the fluid dynamics momentum equation that rectify the first-order oscillatory motion to a second-order mean flow. One way of making the nonlinearities locally large is to arrange a large gradient in the acoustic field. Since a gas such as air has an acoustic impedance three orders of magnitude smaller than that of either liquids or polymeric solids, a sharp change in the interface between a liquid and its gaseous boundary, giving a small radius of curvature and hence large nonlinearities, should be sufficient to generate acoustic microstreaming. The bubble systems hitherto investigated are but one special and highly effective example of this phenomenon however it is now shown similar results may be obtained using a simple meniscus. It may be advantageous to generate microstreaming without trapped bubbles because the chip would be simpler.

The objective of the experiments reported here was to compare the relative mixing times of pure diffusion, microstreaming due to a single pattern, and chaotic microstreaming due to alternating patterns. Since a definitive relative comparison was sought, the priority was to get accurate relative data rather than data from an actual biochemical test, in which additional, harder-to-control factors might compromise accuracy. Hence, the present experiments were done by dye flow visualization. Plain dye diffusion in water is much faster than most of the biochemical reactions foreshadowed, and would have resulted in an experiment that took seconds rather than minutes, reducing the accuracy with which any improvements could be assessed. Hence, the dye diffusion was slowed down by adding potassium chloride to the water and the mixing slowed down by adding glycerol to increase the viscosity of the water. The volume to be mixed should be approximately 10-50 μL, since this is a drop size that might be practically obtained from a patient without complex liquid handling (either too small or too large a volume would pose problems). Moreover, typical calculations on the concentrations of targets (e.g. virions, or antibodies in seropositive patients), coupled with likely detector sensitivities, converge on a value of about 10-50 μL.

The application of acoustic microstreaming to a system typical of a handheld point-of-care pathology screening device results in a decrease in mixing time between one and two orders of magnitude. It was found that the key feature of the device permitting high-amplitude streaming should be an interface between liquid and air with a sharp gradient, and that the gradient due to the free-surface meniscus in a hydrophobic well could be sufficient. More generally though, a large gradient could be caused by any interface with a small radius of curvature between media that have a significant difference in acoustic impedance. Examples of media that have significant differences in acoustic impedance are a liquid and a gas (or a solid and a gas); and an example of an interface with a sharp radius of curvature is a bubble; although the meniscus in a small well seems to do as well. This finding clears the way for a range of practical devices in which drop-sized volumes of liquid from a patient can be conveniently introduced into geometrically simple wells and rapidly micromixed. Without micromixing, many proposed handheld immunoassays would take tens of minutes or hours, and now they would appear feasible in sub-minute times. Complex etched or machined microfluidic geometries would appear unnecessary, at least for the mixing operation. It should be remembered, however, that mixing is only one microfluidic operation that may be necessary, and that other microfluidic operations such as separation, flushing and detection may demand complex geometries.

Driving the acoustic microstreaming into a chaotic mixing regime, in which two alternating flow patterns with crossed streamlines were created by two alternating acoustic frequencies, offered about a further 30-40% improvement in mixing time over using a constant frequency. Given the errors on this estimate, the likely range was 20%-50%, but this figure itself still offers scope for significant improvement. A careful study of the chaotic mixing parameters—basically, the lengths of time the two patterns are applied—should be able to improve on this result[19]. It should be noted that the mixing of a passive tracer is an imperfect model for the actual process, in which a small number of antigen molecules need time to come into contact with 'detector' antibodies. This contact time may be related to the dye mixing rate but is likely to be much longer, since the diffusivity of a large protein may be very significantly lower than the dye molecules; the Peclét number which for a fixed advective process is the inverse of the diffusivity, would be much higher for a real antibody-antigen interaction. It has been shown that as the Peclét number increases, the benefits of chaotic mixing increase[19]. Future experiments should seek to quantify the improvement conferred on actual biochemical assays, using similar quantitative measures.

The invention has been described by way of non-limiting example and many modifications and variations may be made thereto without departing from the spirit and scope of the invention as described.

REFERENCES

1. Ottino, J. M., Wiggins, S., "Introduction: mixing in microfluidics", Phil. Trans. R. Soc. Lond. A (2004) 362, 923-935, 2004.
2. Wiggins, S., Ottino, J. M., "Foundations of chaotic mixing", Phil. Trans. R. Soc. Lond. A (2004) 362, 937-970, 2004.

3. R. H. Liu, R. Lenigk, R. L. Druyor-Sanchez, J. Yang, P. Grodzinski, "Hyrbridization enhancement using cavitation microstreaming", Analytical Chemistry, 75, 1911-1917, 2003.
4. M. W. Losey, R. J. Jackman, S. L. Firebaugh, M. A. Schmidt, K. F. Jensen, "Design and fabrication of microfluidic devices for multiphase mixing and reaction", Journal of Microelectromechanical Systems, 11, 6, 709-717, 2002
5. S. J. Lee, A. Chang-Chien, S. W. Cha, R. O'Hayre, Y. I. Park, Y. Saito, F. B. Prinz, "Design and fabrication of a micro fuel cell array with "flip-flop" interconnection", Journal of Power Sources, 112, 410-418, 2002
6. I. Moser, G. Jobst, G. A. Urban, "Biosensor arrays for simultaneous measurement of glucose, lactate, glutamate, and glutamine", Bionsensors and Bioelectronics, 17, 297-302, 2002.
7. Lee, H. T., Ram, R. J., "Integrated fluid injectors and mixers for pH control in miniature bioreactor arrays", Proceedings, 9th International Conference on Miniaturized Systems for Chemistry and Life Sciences, Boston, Mass., USA, 34-36, Oct. 9-13, 2005.
8. Tatterson, G. B., Fluid mixing and gas dispersion in agitated tanks. Mc Graw-Hill, New York, 548 pp., 1991.
9. Rossman, L. A., Grayman, W. M., "Scale-model studies of mixing in drinking water storage tanks". J. Environmental Eng., 125 (8), 755-761, 1999.
10. T. G. Leighton, The Acoustic Bubble, Academic Press, 1997.
11. Payne, E., Illesinghe, S., Ooi, A., Manasseh, R., "Symmetric mode resonance of bubbles attached to a rigid boundary". Journal of the Acoustical Society of America, 118 (5), 2841-2849.
12. Tho, P. M. F., Cavitation microstreaming in single and two bubble systems, Master of Engineering Science Thesis, University of Melbourne, Australia, October 2005.
13. J. Kolb, W. L. Nyborg, "Small-scale acoustic streaming in liquids", The Journal of the Acoustical Society of America, 28, 6, 1237-1242, 1956
14. S. A. Elder, "Cavitation microstreaming", The Journal of the Acoustical Society of America, 31, 1, 54-64, 1959
15. P. Marmottant, S. Hilgenfeldt, "Controlled vesicle deformation and lysis by single oscillating bubbles", Nature, 423, 153-156, 2003.
16. R. H. Liu, J. Yang, R. Lenigk, J. Bonanno, P. Grodzinski, "Self-contained, fully integrated biochip for sample preparation, polymerase chain reaction amplification, and DNA microarray detection", Analytical Chemistry, 76, 7, 1824-1831, 2004.
17. Manasseh, R., Petkovic-Durana, K., Tho, P., Zhu, Y., Ooi, A. 2005. Acoustic microstreaming applied to batch micromixing. SPIE International Symposium on Microelectronics, MEMS, and Nanotechnology, 11-15 Dec. 2005, Brisbane, Australia.
18. Turner, J. S., Veronis, G. 2000. Laboratory studies of double-diffusive sources in closed regions. J. Fluid Mech. 405, 369-304.
19. Lester, D. R., Metcalfe, G., Rudman, M. 2006. Prospects for efficient enhanced heat transfer in an open chaotic flow. Proc. 13th International Heat transfer Conference, Sydney, Australia, 13-18 Aug. 2006.

The claims defining the invention are as follows:

1. A method of mixing within a liquid, including:
   providing a liquid-gas interface so as to establish an acoustic field gradient;
   applying a first acoustic signal to the liquid to cause the interface to oscillate with a first mode of oscillation, thereby creating a first streaming pattern having first streamlines within the liquid; and
   after applying the first acoustic signal, applying a second acoustic signal that is discretely separate from the first acoustic signal to the liquid to cause the interface to oscillate with a second mode of oscillation that is different from the first mode of oscillation, thereby creating a second streaming pattern having second streamlines within the liquid that is different than the first streaming pattern,
   wherein the second streamlines cross the first streamlines to produce chaotic mixing of the liquid.

2. A method as claimed in claim 1, wherein the interface is provided with a small radius of curvature so as to establish a sharp acoustic field gradient.

3. A method as claimed in claim 2, wherein the radius of curvature is in the order of 2 mm or less.

4. A method as claimed in claim 1, wherein the liquid-gas interface is provided by a gas bubble formed within the liquid.

5. A method as claimed in claim 4, wherein the gas bubble is formed of ambient air.

6. A method as claimed in claim 1, wherein the mixing is performed in a well and the liquid contacts a wall of the well so as to form a meniscus, which produces the acoustic field gradient.

7. A method as claimed in claim 1, wherein application of the first acoustic signal causes the interface to oscillate at a first resonant frequency and application of the second acoustic signal causes the interface to oscillate at a second resonant frequency.

8. A method as claimed in claim 1, further comprising, prior to applying the acoustic signals:
   identifying the first frequency based on the first streaming pattern being associated with the first acoustic mode; and
   identifying the second frequency based on the second streaming pattern being associated with the second acoustic mode,
   wherein the first acoustic signal is at the first frequency and the second acoustic signal is at the second frequency.

9. A method as claimed in claim 1, wherein each of the first and second acoustic signals are applied for at least 15 seconds.

10. A method as claimed in claim 1, further comprising:
    after applying the second acoustic signal, again applying the first acoustic signal to the liquid, such that the first and second acoustic signals are applied in a substantially step-wise manner.

11. A method of mixing, including:
    providing a fluid in a well so as to establish an acoustic field gradient; and
    applying a first acoustic signal to the fluid to cause the acoustic field gradient to oscillate with a first mode of oscillation, thereby creating a first streaming pattern having first streamlines within the fluid; and
    after applying the first acoustic signal, applying a second acoustic signal that is discretely separate from the first acoustic signal to the fluid to cause the acoustic field gradient to oscillate with a second mode of oscillation, thereby creating a second streaming pattern having second streamlines within the fluid that is different than the first streaming pattern, the second mode of oscillation being different than the first mode of oscillation;
    wherein the second streamlines cross the first streamlines to produce chaotic mixing of the fluid.

12. A method as claimed in claim 11, wherein the acoustic field gradient is formed between the fluid and a second fluid.

13. A method as claimed in claim 12, wherein the fluid is a liquid and the second fluid is a gas.

14. A method as claimed in claim 13, wherein the second fluid is ambient air.

15. A method as claimed in claim 14, wherein the first fluid contacts a wall of the well and the acoustic field gradient is established adjacent the wall.

16. A method as claimed in claim 15, wherein the contact of the first fluid with the wall forms a meniscus, which produces the acoustic field gradient.

17. A method as claimed in claim 12, wherein the second fluid is in the form of a gas bubble within the first fluid.

18. A method of mixing, the method comprising:
forming a bubble within a fluid; and
applying a first acoustic signal to the fluid to cause the bubble to oscillate with a first mode of oscillation, thereby creating a first streaming pattern having first streamlines within the fluid; and
after applying the first acoustic signal, applying a second acoustic signal that is discretely separate from the first acoustic signal to the fluid to cause the bubble to oscillate with a second mode of oscillation that is different from the first mode of oscillation, thereby creating a second streaming pattern having second streamlines within the fluid that is different than the first streaming pattern;
wherein the second streamlines cross the first streamlines to produce chaotic mixing of the fluid.

19. A method as claimed in claim 18, wherein the acoustic frequencies are applied such that transition of the bubble-driven flow between the different streaming patterns causes chaotic mixing of the fluid.

20. A method as claimed in claim 18, wherein the different frequencies cause the bubble to transition between one or more of linear transition, volume, shape, elliptical, or circular orbiting oscillation modes.

21. A method as claimed in claim 18, wherein each of the modes of oscillation comprises a mode in which the bubble is excited at a resonant frequency.

* * * * *